United States Patent [19]
Poinelli et al.

[11] Patent Number: 6,041,992
[45] Date of Patent: Mar. 28, 2000

[54] PORTABLE DEVICE FOR INSERTING INTO PREDETERMINED SEATS IN A BODY, SUCH AS AN ITEM OF FURNITURE, FIXING AND/ OR SUPPORT ELEMENTS FOR LOAD-BEARING MEMBERS ASSOCIATED WITH SAID BODY, SUCH AS SUPPORT FEET FOR THE ITEM OF FURNITURE

[75] Inventors: Gaetano Poinelli; Pietro Paolo Sala, both of Milan, Italy

[73] Assignee: BeA Italiana S.p.A., Milan, Italy

[21] Appl. No.: 09/121,547

[22] Filed: Jul. 23, 1998

[30] Foreign Application Priority Data

Aug. 1, 1997 [IT] Italy ................................ MI970590 U

[51] Int. Cl.⁷ .............................. B23P 19/00; B25B 19/00
[52] U.S. Cl. ........................ 227/130; 227/110; 227/113; 227/120; 227/136; 29/798
[58] Field of Search ..................................... 227/130, 136, 227/138, 113, 110, 120; 29/243.523, 243.525, 243.54, 798

[56] References Cited

U.S. PATENT DOCUMENTS

| | | | |
|---|---|---|---|
| 3,945,551 | 3/1976 | Sato et al. .............................. | 227/136 |
| 4,339,065 | 7/1982 | Haytayan ................................ | 227/113 |
| 4,442,965 | 4/1984 | Leistner .................................. | 227/136 |
| 4,581,994 | 4/1986 | Takatsuru ............................... | 227/120 |
| 5,205,456 | 4/1993 | Ohuchi et al. .......................... | 227/120 |
| 5,214,843 | 6/1993 | Bromley et al. ......................... | 29/798 |
| 5,323,531 | 6/1994 | Leistner et al. .......................... | 29/798 |
| 5,560,099 | 10/1996 | Leistner et al. .......................... | 29/798 |

*Primary Examiner*—Peter Vo
*Assistant Examiner*—James Calve
*Attorney, Agent, or Firm*—Steinberg & Raskin, P.C.

[57] ABSTRACT

A portable device (1) for inserting into predefined seats in a body, such as an item of furniture, fixing and/or support elements (8) for load-bearing members associated with said body such as furniture support feet, said device (1) comprising a casing (2) with an expulsion unit (7) for said elements (8) to which a pressurized fluid is fed and which has an element (14) subjected to said fluid and movable between two working positions, in one of which it is retracted into said unit and in the other of which it cooperates with sad elements (8) for their expulsion from an exit mouth (10) of said unit (7), said elements (8) originating from a magazine (9) associated with said casing (2). When in the expulsion position, the movable member (14) emerges from the exit mouth (10) of the expulsion unit (7), said position being attained on connecting the device (1) to the fluid source.

9 Claims, 4 Drawing Sheets

PORTABLE DEVICE FOR INSERTING INTO PREDETERMINED SEATS IN A BODY, SUCH AS AN ITEM OF FURNITURE, FIXING AND/OR SUPPORT ELEMENTS FOR LOAD-BEARING MEMBERS ASSOCIATED WITH SAID BODY, SUCH AS SUPPORT FEET FOR THE ITEM OF FURNITURE

FIELD OF THE INVENTION

This invention relates to a device in accordance with the introduction to the main claim.

BACKGROUND OF THE INVENTION

In the field of fixing elements, devices operated by pressurized fluid, usually air, are known for "firing" such elements (such as nails) into the relative body which is to receive them.

Such devices are not however used for threaded sleeves or sockets used for example in the furniture field for fixing support feet or internal shelves to the furniture. They cannot be used, because their construction does not allow correct positioning of such sockets (or fixing and/or retention elements) in the seats provided in the relative body, neither do they allow such elements to be accurately located in the firing position.

Known methods used to secure such fixing and/or retention elements (sockets) to the relative body, for example to a furniture item, use presses which are of large size and weight, and are therefore not transportable. They can therefore only be used in suitable factories and not on the site on which the furniture is assembled. For this reason the only known method for securing such sockets to furniture on its final assembly is by hand.

OBJECTS AND SUMMARY OF THE INVENTION

An object of this invention is to provide a portable device for inserting the aforesaid fixing and/or retention elements into seats provided in a body, such as a furniture item, in an automatic, simple, quick and reliable manner.

This and further objects which will be apparent to the expert of the art are attained by a device in accordance with the accompanying claims.

BRIEF DESCRIPTION OF THE DRAWINGS

The invention will be more apparent from the accompanying drawing, which is provided by way of non-limiting example and on which.

DETAILED DESCRIPTION OF THE PREFERRED EMBODIMENTS

Figure 1:
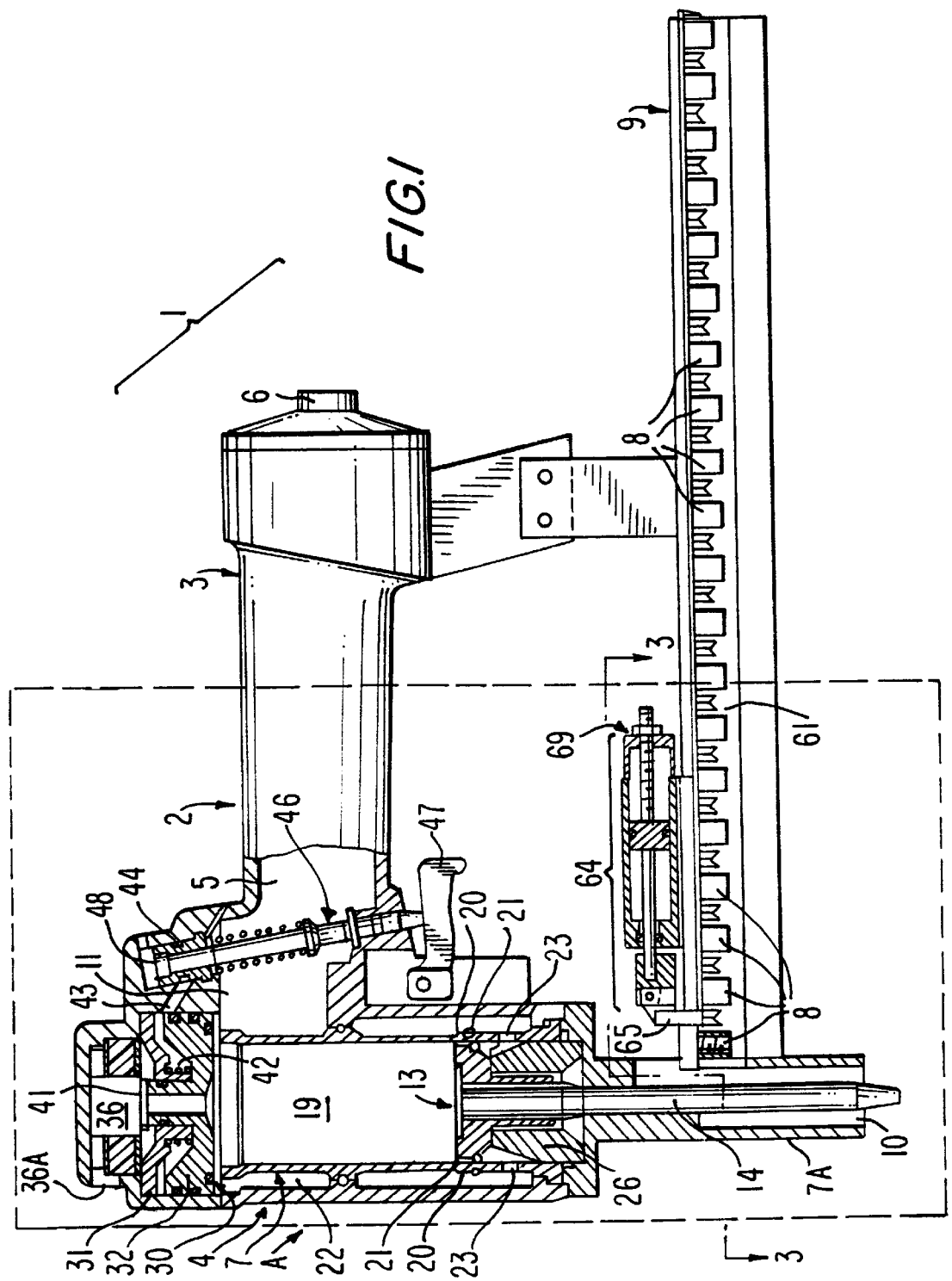
FIG. 1 is a partly sectional overall view of the device of the invention, with certain parts omitted for greater clarity.

With reference to said figures, a device of the invention is indicated overall by 1 and comprises a casing 2 with a handgrip portion 3 and an end 4. The handgrip portion 3 is hollow at 5 and can be connected to a source of pressurized fluid, such as compressed air, via a known connector 6. The end portion 4 comprises an expulsion unit 7 for threaded elements or sockets (known as T-nuts, gripper nuts or spiders) associated with a straight loader or magazine 9 secured in any known manner to the lower end 7A of the unit 7, where an expulsion mouth 10 is provided for such elements.

The portion 4 is also hollow and communicates with the cavity 5 of the handgrip portion 3 via a corridor 11 intercepted by a cylindrical body 12 acting as a guide for a piston 13 with which an expulsion member or punch 14 for the elements 8 is associated. This punch is arranged to emerge from the mouth 10 on connecting the member 6 to the compressed air source, so as to act as a centering member for the insertion of a element 8 into a respective seat provided in a body (not shown) with which said element or socket has to be associated.

The piston 13 comprises a head 17 provided with an annular cavity 18 arranged to connect an internal cavity 19 of the body or cylinder 12 (within which this piston moves under the action of the compressed air) to an annular chamber 22 provided between the lower end of said cylinder and a wall of a lower part 4A of the portion 4. For this purpose, the cylinder 12 comprises a plurality of radial through holes 20 provided in its jacket 12A, a known unidirectional valve 21 being provided in correspondence with each of said holes. The jacket 12A comprises a second series of radial holes 23 provided in a lower plane than that in which the holes 20 are present, and arranged to connect the annular chamber 22 to the cavity 19 of the cylinder 12. When the piston 13 has reached its lower working position in which the punch 14 emerges from the mouth 10, the holes 23 open below the piston to the side of a damping member 26 acting as a limit stop for the piston. The annular chamber 22 is closed upperly by an annular wall 27 terminating at the jacket 12A of the cylinder 12, between which an annular seal gasket 28 is advantageously positioned.

Figure 2:
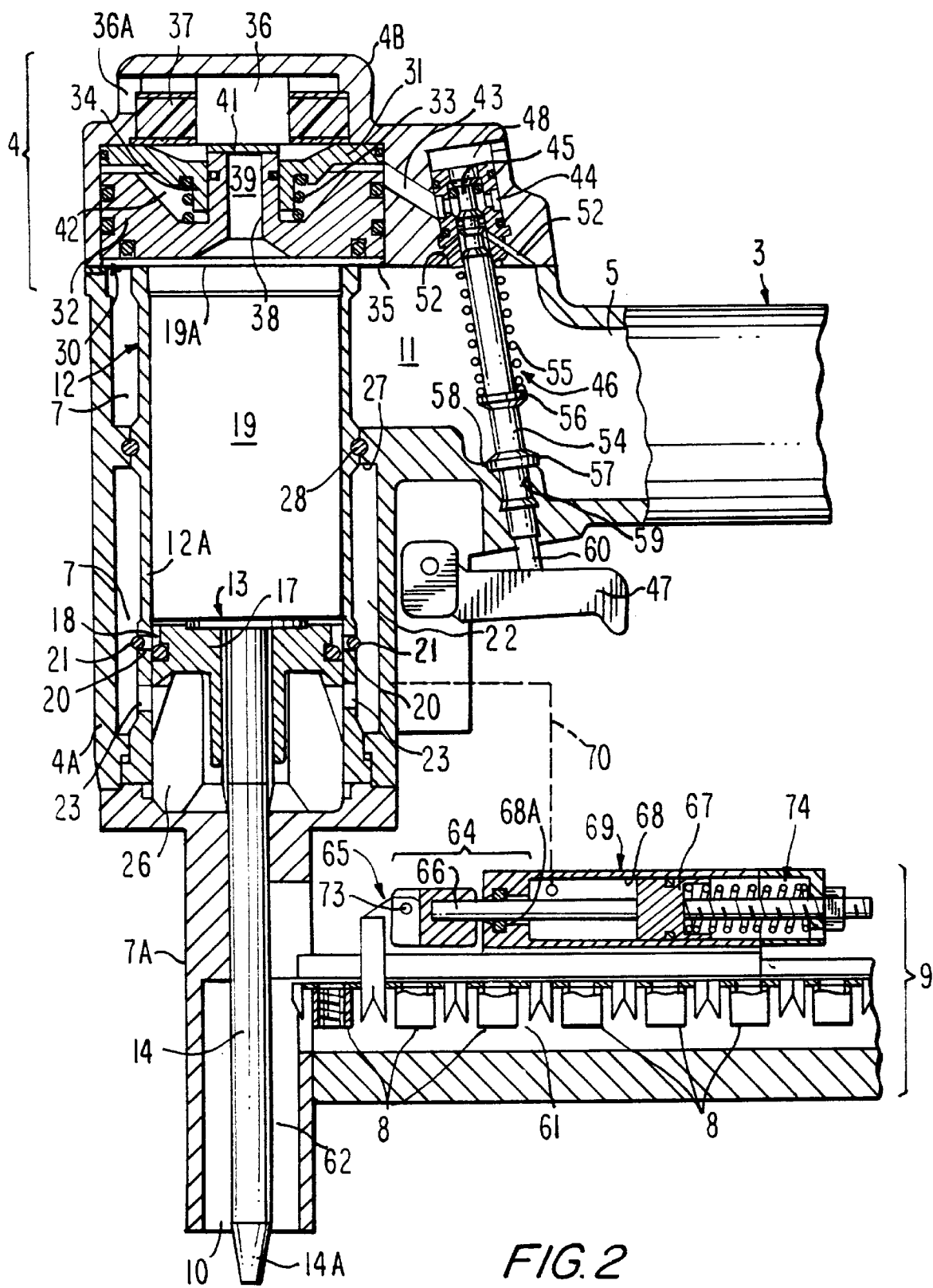
FIG. 2 is an enlarged cross-section through the part indicated by A in FIG. 1.

The cavity 19 of the cylinder 12 is upperly open at its end 19A, where there is positioned a valving member 30 comprising two portions 31 and 32 movable relative to each other against a spring 33 interposed between them and mounted about a hollow cylindrical part 34 of the first portion 31. This latter is fixed in a seat 35 for the member 30 in proximity to an air discharge hole 36 provided in the head 4B of the end 4 of the casing 2 and opening to the outside thereof at 36A. A usual filter 37 is positioned within the hole 36. The second portion 32 of the member 30 comprises a cylindrical part 38 axially holed at 39 and inserted into the part 34 of the first portion 31. The portion 32 is able to move within the seat 35 to assume two working positions, namely a first in which it rests on the cylinder 12 to intercept the end 19A of its cavity, and a second (shown in FIGS. 1 and 2) in which it frees the access to this cavity and in which the cylindrical part rests against a closure member 41 for its hole 39 associated with the filter 37.

Figures 4A, 4B:
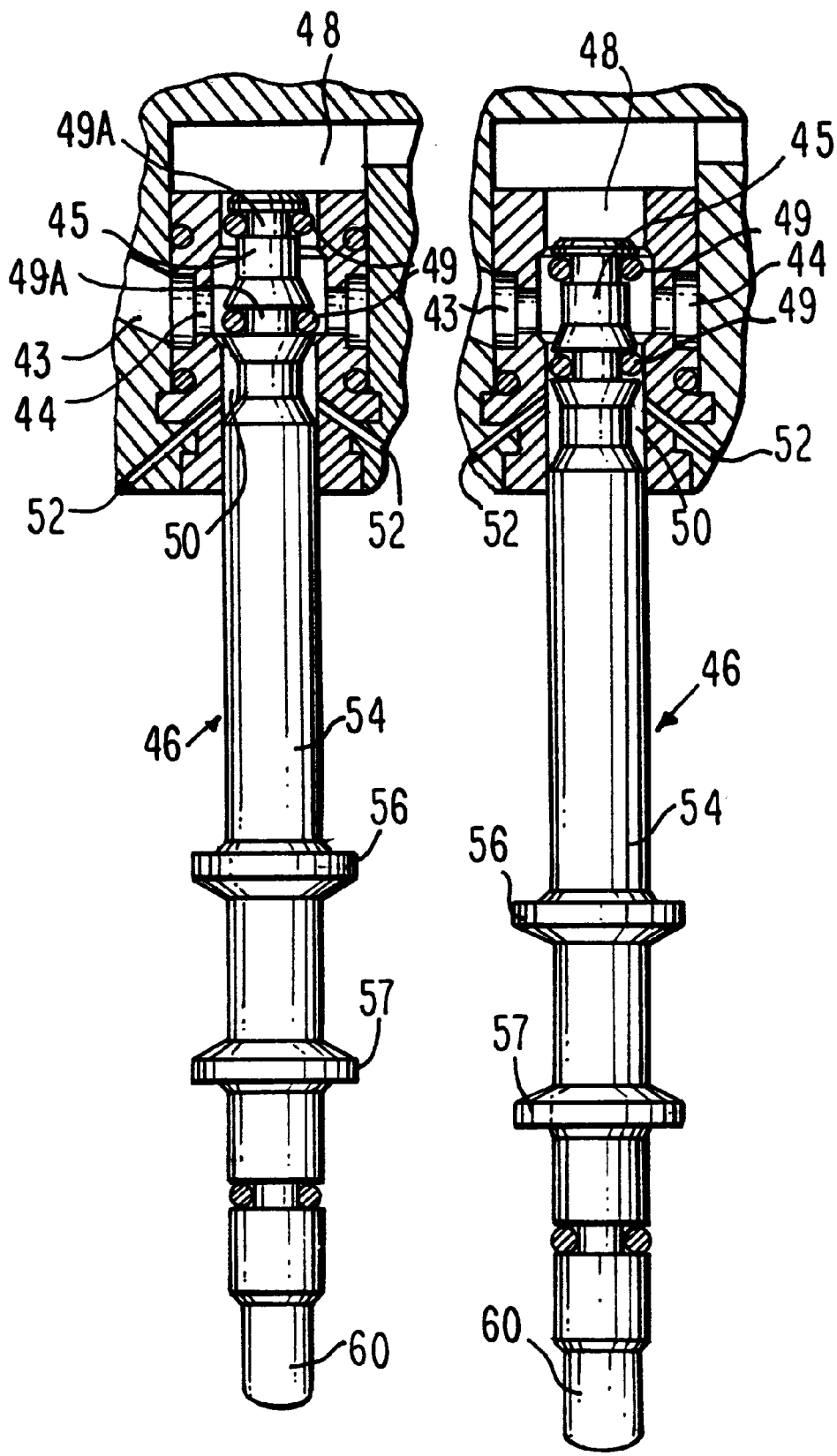
FIGS. 4A and 4B are schematic views, with certain parts omitted for greater clarity, of a component of the device of the invention shown in two different positions of use.

Between the first and second portion 31 and 32 of the valving member 30 there is a cavity 42 connected to a conduit 43 terminating in a seat 44 in the head 45 of a valve 46 operated by an actuator or trigger 47 associated with the casing 2. The seat 44 communicates with the outside of the casing 2 via a conduit 48. The head 45 of the valve (see FIGS. 4A and 4B) comprises annular seal members 49 positioned in relative seats 49A and arranged to intercept respectively the conduit 48 and the conduit 50 which connects the seat 44 (and hence said cavity 42) to a pair of conduits 52 connecting this seat to the cavity 5 of the handgrip portion 3.

The valve 46 comprises a stem 54 carrying the head 45 and on which there is positioned a spring 55 for always returning the valve into a position (shown in FIG. 4B) in which it intercepts the conduit 50. The stem 54 carries a pair of collars 56 and 57, the first cooperating with the spring 55 and the second with a shoulder 58 of the portion 3 bounding a through hole 59 through which an end 60 of the stem emerges from the portion 3 to cooperate with the trigger 47.

As stated heretofore, the magazine 9 is associated with a lower end 7A of the expulsion unit 7. This magazine comprises a chamber 61 in which the elements 8 are placed and which opens into a cavity 62 in the end 7A within which there are positioned two permanent magnets 63 for retaining within this cavity the element brought there by a mover or pusher member 64 (associated with the magazine) after this latter, which undergoes reciprocating movement, has assumed a rest position ready for the next movement of the element 8. Specifically, the pusher 64 comprises a fork-shaped gripper member 65 arranged to cooperate with the sides of each element 8. This member is associated with the rod 66 of a piston 67 movable within a chamber 68 in a body 69 fed with the pressurized fluid or compressed air present in the annular chamber 22 of the portion 4 of the casing 2. This is achieved via a tube 70, shown schematically in FIG. 2, and connecting the chamber 22 to the chamber 68. It opens into this latter in correspondence with its end 68A. The fork member 65 is hinged to the rod 66 via a pin 73 on which there is positioned an elastic return element (not shown, such as a flat spiral spring) providing an elastically loaded movement to said member when it is drawn towards the cylinder 69 during passage of the pusher 64 into its rest position.

Figure 3:
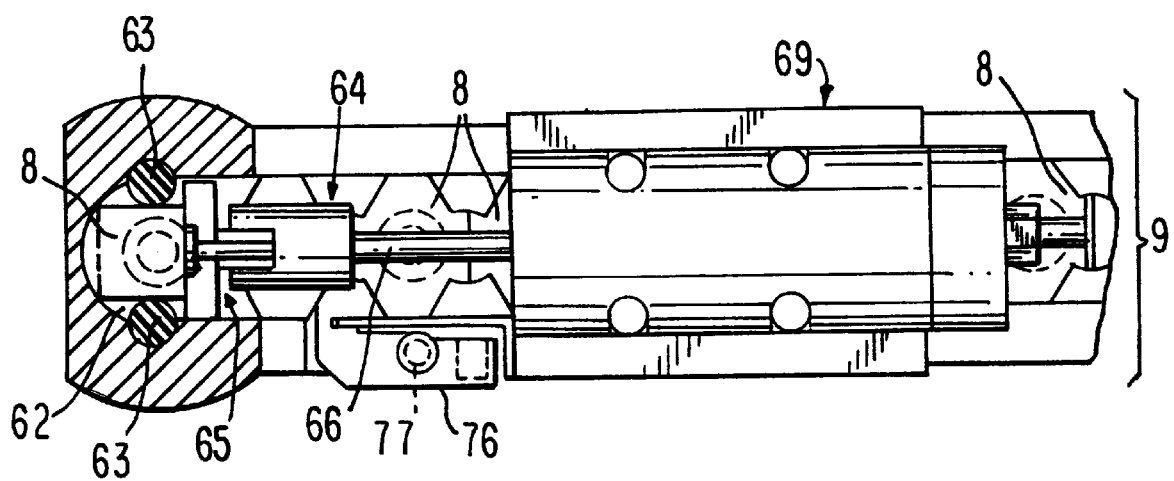
FIG. 3 is an enlarged sectional view from above, taken on the line 3—3 of FIG. 1.

The piston 67 cooperates with a spring 74 positioned within the cylinder 69 and arranged to move the pusher into the position in which it loads the socket 8 shown in FIG. 3.

Laterally, the magazine 9 comprises an elastically loaded tooth 76 hinged to said magazine at 77 (at which a flat spiral spring or an equivalent elastic element is positioned). This tooth acts as a stop member for the movement of the sockets 8 so that they do not re-enter the magazine 9 when the pusher 64 returns to its rest position.

It will now be assumed that the device 1 is to be used. On connecting it to the compressed air source, the air passes into the cavity 5 of the portion 3 and reaches the portion 4 around the cylinder 12. Here it presses against the valving member 30 to move its portion 32 against the spring 33. In this manner, this portion separates from the end 19A of the cavity 19 of the cylinder 12 to enable compressed air to enter this cavity. This air hence urges the piston 13 into the position of FIGS. 1 and 2 in which the punch 14 is external to the mouth 10. In this position, the air is able enter the annular chamber 22 via the cavity 18 of the piston 13 and the radial holes 20, and from there it enters the chamber 68 of the cylinder 69 to move the piston 67 into the position of FIGS. 1 and 2, ie to move the pusher 64 into its rest position, against the spring 74.

Arranged in this manner, the device 1 is brought into a position corresponding with the seat into which the socket 8 is to be inserted. The punch 14 is inserted into this seat to hence act as a centering member for the insertion of said socket.

The trigger 47 is then pressed. On doing this, the head 45 of the valve 46 moves into the position of FIG. 4, to connect the cavity 5 containing compressed air to the cavity 42 between the portions 31 and 32 of the valving member 30. In this manner the pressure of the air is added to the force of the spring 33, and the portion 32 moves onto the end 19A of the cavity 19 of the cylinder 12, to intercept it. The pressure in this latter is discharged to the outside of the device 1 through the hole 39 and the aperture 36A, and the air in the chamber 22, in passing into the cavity 19 below the piston 13 (with reference to the figures), moves this latter upwards, ie towards the valving member 30. Simultaneously the pressure in the chamber 68 of the cylinder 69 is discharged through the tube 70, the spring 74 then moving the pusher 64 towards and into the cavity 62 of the portion 4. The pusher drags a socket 8, which is retained in the cavity 62 by the magnets 63.

The trigger 47 is now released. The head 45 of the valve 46 moves into the position shown in FIG. 4B so that the conduit 48 again becomes connected, as when in its initial position, to the cavity 42. The pressure or the compressed air present therein is discharged to the outside of the device 1. In addition, communication between the cavity 5 and the cavity 42 ceases. In this manner the compressed air again acts on the portion 32 of the member 30, to move it upwards in FIG. 2 and release the end 19A of the cavity 19 of the cylinder 12. The compressed air again acts on the piston 13 as initially described, and the punch 14 again moves to the outside of the mouth 10, taking with it the socket 8 present in the cavity 62. It should be noted that releasing the trigger 47 again results in passage of air into the chamber 68 of the cylinder 69 so that the pusher 64 returns to its rest position shown in FIGS. 1 and 2 (the socket is retained in the cavity 62 by the magnets 63).

It should be noted that the point 14A of the punch 14 is frusto-conical so as to adapt to different dimensions of the hole in the socket 8. The point 14A has a sharp edge to cleanly cut away the usual strip material which maintains the sockets 8 united within the magazine 9, in order to prevent that socket about to be expelled from being maintained connected by the strip material to those within the magazine. In addition, the taper of the point 14A enables the socket to be expelled without ruining its thread.

A preferred embodiment of the invention has been described. Others are however possible and are to be considered as falling within the scope of the invention.

We claim:

1. A portable device (1) for inserting fixing and support elements (8) into predefined seats in a body of soft material, said device (1) comprising a casing (2) with a handgrip portion (3) an expulsion unit (7) for said support elements (8) to which a pressurized fluid is fed and which has a movable element (14) subjected to said fluid and movable between two working positions, in one of which positions, retracted, it is retracted into said unit and in the other of which positions, expulsion, it cooperates with said elements (8) for their expulsion from an exit mouth (10) of said expulsion unit (7), said support elements (8) originating from a magazine (9) associated with said casing (2), there being provided command means (47) for triggering said expulsion and valve means (46) for selectively subjecting the movable element (14) to the pressurized fluid and thereby enabling the movable element (14) to pass from the expulsion position to the retracted position, wherein when in the expulsion position, the movable element (14) emerges from the exit mouth (10) of the expulsion unit (7), said expulsion position being attained on connecting the device (1) to the pressurized fluid source, wherein pressurized fluid enters said expulsion unit (7) and moves the movable element (14) to the expulsion position prior to any expulsion of a corresponding fixing and support element (8), wherein the movable element (14) acts as a centering member for the implementation of said expulsion.

2. A device as claimed in claim 1, wherein the movable member is a punch (14) associated with a piston (13) movable within a cylinder (12) provided in a portion (4) of the casing (2) of the device (1), said punch having one end (14A) arranged to cooperate with the fixing and/or support elements (8) at their expulsion, said end having a frusto-conical shape with sharp edges.

3. A device as claimed in claim 2, wherein the end (14A) of the punch (14) moves within an end cavity (62) in the portion (4) of the casing (2) into which there opens a cavity (61) of the magazine (9) and in which there are provided means for retaining the fixing and/or support elements (8) prior to their expulsion from the exit mouth (10).

4. A device as claimed in claim 3, wherein the retention means are permanent magnets.

5. A device as claimed in claim 1, wherein the magazine is rectilinear.

6. A device as claimed in claim 1, further comprising pusher means (64) for moving the fixing and support elements toward the end cavity for their expulsion from the exit mouth (10).

7. A device as claimed in claim 6, wherein the pusher means (64) are pneumatically connected to the expulsion unit (7).

8. A device as claimed in claim 7, wherein the pusher means comprise a fork member (65) hinged (at 73) to a rod (66) associated with a piston (67) movable within a chamber (68) of a body (69) associated with the magazine (9), said piston mechanically engaging elastic means present in said chamber, this latter communicating via a conduit (70) with an annular chamber (22) provided about the cylinder (12) within which there moves the piston (13) associated with the movable expulsion member for the fixing and/or support elements (8), said chamber (22) communicating with said cylinder via apertures (20, 23) positioned in two different planes, means (76) being provided to prevent the return into the magazine of those elements (8) already in position for their subsequent expulsion.

9. A device as claimed in claim 1, wherein the enabling means (46) are a valve operated by the command means (47) to selectively intercept a bleed conduit (48) and pressurized fluid introduction conduit (52) communicating with a cavity (42) within which a valving member moves to intercept the entry of pressurized fluid into the cylinder (19) in which the piston (13) moves, said valve intercepting the pressurized fluid introduction conduit (52) on connecting the device (1) to the source of said fluid, and intercepting the bleed conduit (48) on loading a fixing and/or support element (8) into the expulsion position.

* * * * *